No. 823,358. PATENTED JUNE 12, 1906.
D. M. PEARCE.
SEED PLANTER.
APPLICATION FILED DEC. 30, 1905.
2 SHEETS—SHEET 2.
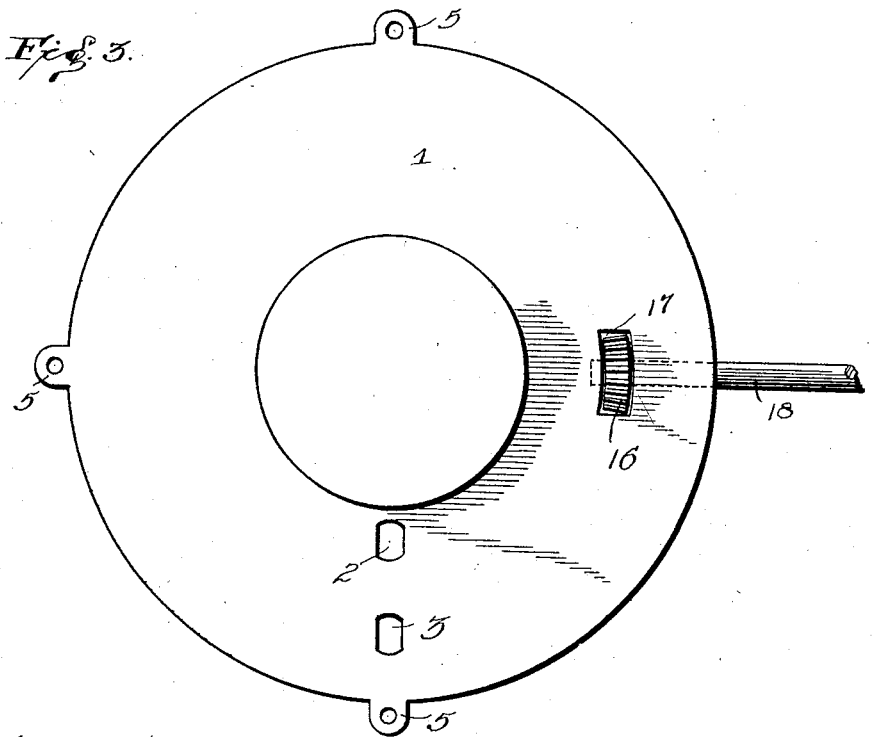
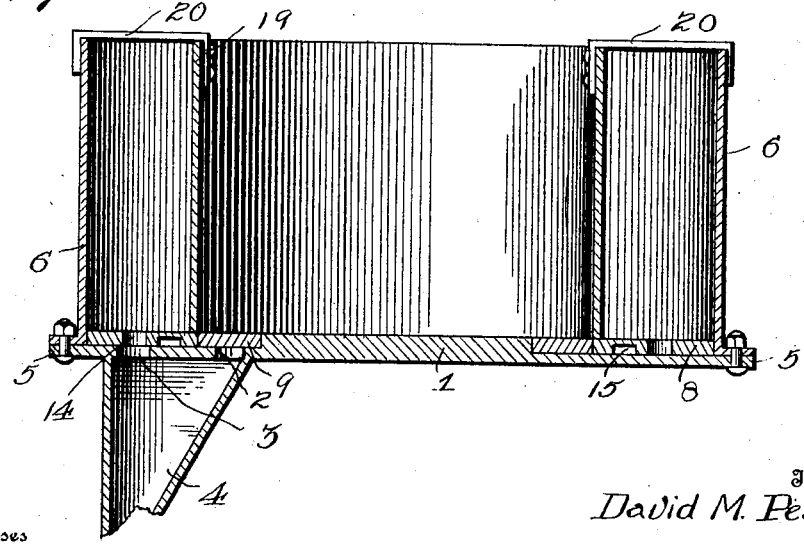
Witnesses
F. J. Veihmeyer
E. S. Elliott
Inventor
David M. Pearce
By Edson Bros,
Attorneys

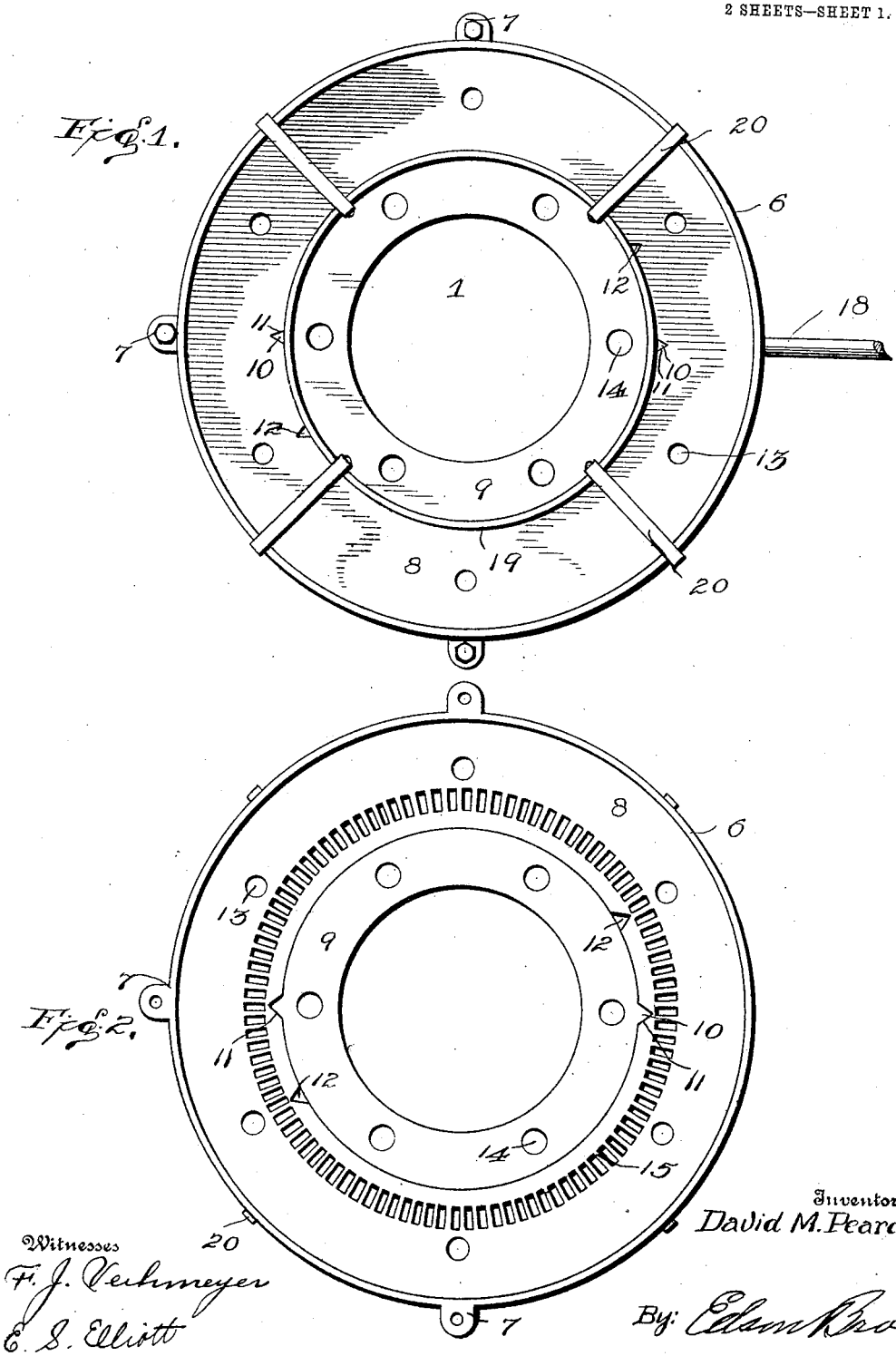

UNITED STATES PATENT OFFICE.

DAVID M. PEARCE, OF UNION CITY, TENNESSEE.

SEED-PLANTER.

No. 823,358. Specification of Letters Patent. Patented June 12, 1906.

Application filed December 30, 1905. Serial No. 293,959.

*To all whom it may concern:*

Be it known that I, DAVID M. PEARCE, a citizen of the United States, residing at Union City, in the county of Obion and State of Tennessee, have invented certain new and useful Improvements in Seed-Planters; and I do hereby declare the following to be a full, clear, and exact description of the invention, such as will enable others skilled in the art to which it appertains to make and use the same.

My invention relates to improvements in seed-planters.

It has for its object to provide a practical planter adapted for sowing two kinds of seed at the same time in the same hills or in alternate hills.

The invention consists in the features of construction and combinations of parts hereinafter described, and more particularly pointed out in the claims concluding this specification.

In the accompanying drawings, illustrating the preferred embodiment of my invention, Figure 1 is a plan view of the double seed-hopper in place on the supporting-base. Fig. 2 is an under plan view of said hopper. Fig. 3 is a plan view of the base with the hopper removed; and Fig. 4 is a central vertical sectional view of the device shown in Fig. 1, taken on a line passing through the outlet-openings in the base.

Referring more particularly to the drawings, the base-plate 1, which is adapted to be secured to the framework of a planter, is provided with two apertures 2 and 3, communicating with a spout 4. Said base has ears 5, to which the outer side ring or rim 6 is secured by means of other ears 7. Within said rim is placed two plates, an outer one, 8, and an inner one, 9. The inner plate is adapted to fit neatly within the outer plate and has projecting lugs 10 on its outer edge adapted to engage either of two sets of notches 11 and 12 in the inner edge of the outer plate. Each plate is provided with a series of holes 13 and 14, respectively arranged in the paths of the apertures 2 and 3 in the base. There are the same number of holes 13 in the inner plate as there are holes 14 in the outer plate, and the holes in each plate are arranged equidistant apart. When the inner plate is arranged with its lugs 10 engaging the notches 11 in the outer plate, the holes 14 in said inner plate will alternate with the holes 13 in the outer plate. When the lugs 10 engage the notches 12, the holes 14 are in line with the holes 13 and will pass over the apertures 2 and 3 simultaneously, whereas in the first-described arrangement they will alternately pass over said apertures.

On the under surface of the outer plate 8 and preferably integral therewith is a gear-surface 15, adapted to be engaged by a gear-wheel 16, extending up through a slot 17 in the base. Said gear-wheel is mounted on a shaft 18, which may be connected up with a check-row or other suitable actuating mechanism. By this means the outer plate and the inner one, which is attached thereto by means of the lugs 10, are revolved to cause said holes 13 and 14 to pass over the apertures 2 and 3.

An inner vertical ring or rim 19 is set within and is concentric with the outer ring 6 upon the revoluble plates near their meeting edges. Said inner ring is held in proper position with relation to the outer ring by means of radial arms 20, whereby it may also be lifted out when it is desired to change the relation of the inner plate to the outer one or to remove said inner plate and substitute another one with a different size of hole therein for sowing a different kind of seed. Said inner ring divides the hopper formed by the outer ring and the revoluble plates into two compartments, each adapted to receive a different kind of seed and feed it to the spout 4. The distance of the hills apart, the number of seeds sown to each hill, &c., may be regulated by the number and size of the holes 13 and 14. The great advantage which I claim for my invention over other planters in use is that seeds of different kinds may be planted at the same time in the same rows, either in the same hills or in alternating hills, thereby saving time and labor and providing for the two crops coming on for work at the same time and in the same manner.

Having thus described my invention, what I claim as new, and desire to secure by Letters Patent, is—

1. In a planter, a double hopper adapted to hold two kinds of seed, and means to feed both kinds of seed to the same row and in alternate hills.

2. In a planter, a hopper having concentric compartments adapted to hold two kinds of seed, perforated plates arranged at the bottom of said hopper, a base-plate arranged below said perforated plates and provided with two apertures; a spout arranged below said apertures and means to revolve said perforated plates to cause the perforations therein to pass over said apertures, whereby both kinds of seed may be sown in the same row but in alternate hills.

3. In a planter, a hopper having concentric compartments adapted to hold two kinds of seed, a base-plate having two apertures arranged in the same radial line, a spout arranged below said apertures, perforated plates arranged at the bottom of said hopper upon said base-plate, and means to revolve said perforated plates to cause the perforations therein to pass over said apertures, whereby both kinds of seed may be sown in the same row but in alternate hills.

4. In a planter, a hopper having concentric compartments adapted to hold two kinds of seed, a base-plate having two apertures arranged in the same radial line, a spout arranged below said apertures, concentric perforated plates arranged at the bottom of said hopper upon said base-plate, lugs on one of said plates adapted to engage either of two sets of notches in the other plate, whereby the holes in the two plates may be arranged in the same radial lines or alternately to each other, and means to revolve said perforated plates to cause the perforations therein to pass over the apertures in the base-plate.

5. In a planter, a hopper having concentric compartments adapted to hold two kinds of seed, a base-plate having two apertures therein, a spout arranged below said apertures, concentric perforated plates arranged at the bottom of said base-plate, one of said plates having a gear-surface on its under surface, a gear-wheel meshing with said gear-surface, and means to revolve said gear, whereby the perforated plates are rotated to cause the perforations therein to pass over the apertures in the base-plate.

6. In a planter, a hopper having a base-plate provided with two apertures therein, an outer vertical ring secured to said base-plate, concentric perforated plates arranged on said base-plate, an inner vertical ring arranged concentrically to the outer ring upon said perforated plates near their meeting edges, and means to revolve said perforated plates to cause the perforations therein to pass over the apertures in the base-plate.

In testimony whereof I affix my signature in presence of two witnesses.

DAVID M. PEARCE.

Witnesses:
E. V. CALDWELL.
BRUCE SCOGGIN.